Sept. 8, 1970  H. P. LANDI  3,527,616
ELECTRODES FOR FREE ELECTROLYTE FUEL CELLS
Filed June 9, 1965
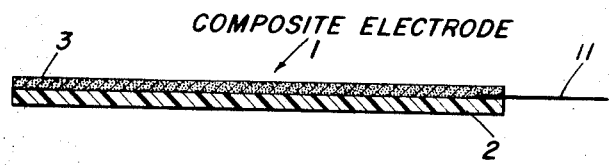
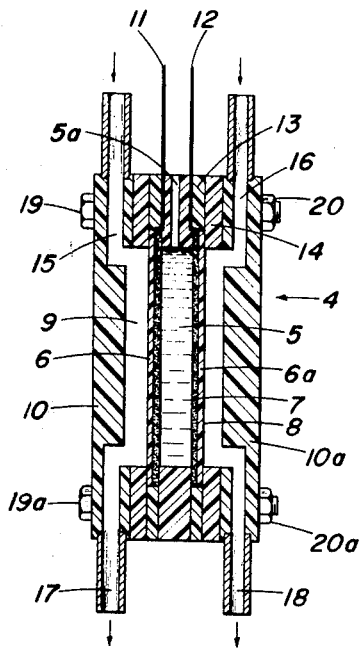

United States Patent Office 3,527,616
Patented Sept. 8, 1970

3,527,616
ELECTRODES FOR FREE ELECTROLYTE FUEL CELLS
Henry Patrick Landi, Yorktown Heights, N.Y., assignor to American Cyanamid Company, Stamford, Conn., a corporation of Maine
Filed June 9, 1965, Ser. No. 462,615
Int. Cl. H01m 27/00, 13/00
U.S. Cl. 136—86                    9 Claims

ABSTRACT OF THE DISCLOSURE

A laminated catalytic electrode suitable for use in free electrolyte fuel cells comprising in combination: (a) a gas permeable, liquid impermeable, porous, fibrillated, unsintered polytetrafluoroethylene substrate and (b) a composition molded thereon comprising (1) an electrically conductive filler being present in an amount equal to between about 0% and 80%, (2) a catalyst equal to from about 1% to about 98%, and (3) a water-repellent composition equal to from about 1% to 40%, said percentages totalling 100%, being based upon the weight of the electrode solids mixture, is provided.

---

The present invention relates to improved catalytic electrode structures and processes for preparing such structures suitable for use in free electrolyte type fuel cells. More particularly, the invention relates to the preparation of catalytic electrode structures comprising a liquid impermeable, but gas permeable substrate and coated or laminated thereon a layer comprising an inorganic catalytic compound and a well-defined class of binders or water-proofing agents. Still more particularly, this invention is concerned with the preparation of molded, porous, unsintered, fibrillated polytetrafluoroethylene electrodes containing a coating or laminate prepared from either a polyethylene latex emulsion or a polytetrafluoroethylene emulsion as the binder and waterproofing agent in admixture with a suitable catalyst.

In the past, electrodes prepared for use in fuel cells have been molded, for instance, from either platinum black or from any suitable noble metal on carbon and supported on a metal screen. Such electrodes are not universally employed because of rapid failure due to the flooding of the resultant electrode in matrix type fuel cells. In free electrolyte type fuel cells, such electrodes are also short-lived. To obviate the flooding phenomenon, it has been proposed to add binders or water-proofing agents, such as petroleum waxes or polytetrafluoroethylene, immediately prior to molding of the platinum black or noble metal catalyst supported on carbon. Nonetheless, the so-prepared electrode has not been wholly suitable for use in a free electrolyte cell system. It has been proposed that the electrode structure could be modified whereby a gas permeable, liquid impermeable polytetrafluoroethylene membrane which is rendered porous by sintering the membrane, could be laminated to a conductive catalyst, as for instance, platinum black in which a collector screen is mounted. Unfortunately, the durability of such overall laminated structure with respect to liquid electrolyte leakage is poor.

It is, therefore, a principal object of the present invention to provide an improved free electrolyte-type catalytic electrode structure which is substantially liquid impermeable, but gas permeable. It is a further object of the invention to provide a catalytic, highly efficient electrode capable of being prepared in a simple, straightforward and economical manner and being operable at from room temperature to about 225° C. These and other objects will become apparent from a consideration of the following detailed description.

It has been surprisingly found that a method for preparing an electrode structure of good performance, enhanced water-proofed properties and substantially free from electrolyte leakage can be provided in a straightforward manner. In brief, this is accomplished by (1) admixing a water-proofing latex and a catalyst metal which can, if desired, be extended with electrically conductive filler to form a paste and, thereafter, (2) coating said paste mixture on a substrate of a porous, fibrillated, unsintered polytetrafluoroethylene. The so-coated substrate is next subjected to sufficient heat and pressure so as to bind the coating to said substrate. Advantageously, the latter permits the use of the cell which can be heated, for instance, with a heating mantle operable at temperatures in excess of 100° C., and preferably at temperatures between 125° C. and 225° C.

Alternatively, the catalytic paste mixture may be spread over a suitable inert screen fabricated from either metal or plastic and the resultant structure may be laminated to the aforementioned porous, fibrillated substrate by employing heat and pressure to cause a laminate to form. This laminate forms without difficulty due to the nature of the porous, fibrillated polytetrafluoroethylene in binding to a supported wire mesh screen or expanded metal screen electrode structure. Thus, there is prepared an electrode suitable for use in free electrolyte fuel cells.

In preparing the porous, unsintered, fibrillated "Teflon" substrate of the present invention, a blend of (a) from 1% to about 40%, and preferably, from 5% to 25%, by weight of polytetrafluoroethylene (TFE) in the form of an aqueous dispersion containing about 60% solids and up to about 6.0% of a suitable surfactant or wetting agent based on the weight of TFE resin and (b) from about 99% to about 60% of polymethylacrylate is milled on preheated rolls at 170–200° C. During the milling operation, the polytetrafluoroethylene particles form lengthy interwoven, interconnected fibrils. For instance, a plaque (⅛" x 2" x 4"), formed by injection molding a blend of the above, is compressed between caul plates for from five to ten minutes at 170–200° C. and about 3000 pounds per square inch, cooled to room temperature, and released from the mold. The formed sheet measures approximately 6 inches square and from ten to forty mils thick. This sheet is then soaked several times in acetone to extract or remove all of the polymethylmethacrylate. The latter substrate sheet is rinsed with alcohol, washed several times with deionized water, and dried by rolling between blotter paper. Thus, for instance, a sheet of 0.010 inch thickness prepared from a blend of 80% polymethylmethacrylate and 20% polytetrafluoroethylene utilizing the foregoing procedure possesses the following characteristics in Table I below.

TABLE I

| | |
|---|---|
| Thickness (inches) | 0.010±0.002 |
| Total porosity (volume percent) | 66.0 |
| Mean pore diameter (microns) | 10 |
| Permeability to 6MH$_3$PO$_4$ at 25° C. (atmospheres)[1] | 0.97 |
| Tensile strength (p.s.i.) | 2290 |
| Tear strength (pounds): | |
|     Initial | 3.6 |
|     Maximum | 5.0 |
| Percent elongation | 15.9 |
| P.T.F.E. fiber thickness (microns) | 0.2–1.0 |

[1] Permeability is defined as the differential pressure in atmospheres required to push aqueous electrolyte through a sheet—the larger the number, the less permeable the sheet.

In contrast with the above, two commercially available sintered, porous "Teflon" sheets possess the following properties tabularized in Table II below.

TABLE II

| | I | II |
|---|---|---|
| Thickness (inches) | 0.010–0.015 | 0.040–0.5 |
| Total porosity (volume percent) | 68.6 | 45.0 |
| Mean pore diameter (microns) | 4 | 9 |
| Permeability to 6M H₃PO₄ at 25° C. (atmospheres)¹ | 0.20 | 0.16 |
| Tensile strength (p.s.i.) | 540 | 100 |
| Tear strength (pounds): | | |
| Initial | 0.5 | 0.15 |
| Maximum | 0.8 | 0.23 |
| Percent elongation | 173 | 8.1 |
| P.T.F.E. fiber thickness (microns) | None | None |

¹ Permeability is defined as the differential pressure in atmospheres required to push aqueous electrolyte through a sheet—the larger the number, the less permeable the sheet.

From the foregoing tables it is cogently clear that the unsintered, extensively fibrillated substrate of the present invention is markedly superior to the sintered materials in mechanical properties, such as tensile and tear strength and in its ability to prevent leakage of aqueous electrolytes commonly used in fuel cells.

Sheets of larger size can be prepared depending on the size of the initially extruded or compressed sheet of the polymethylmethacrylate and polytetrafluoroethylene blend.

The procedure as outlined above may be applied to polytrifluorochloroethylene to similarly obtain a porous, unsintered, fibrillated structure.

Advantageously, the substrate as prepared above may incorporate a conductive metallic powder or fiber of from about 1% to about 80%, based on the weight of the substrate. Such conductive metallic powders or fibers include illustratively tantalum or gold powder of about 300 mesh or thin tantalum or gold fibers with diameters in the range of 0.001 inch to 0.0001 inch.

A suitable current collector may also be embedded between the catalytic paste and the substrate surface. This may be a wire mesh of nickel, stainless steel or the like.

In preparing the catalytic paste composition, there is employed an electrically conductive filler, as for instance, graphitic carbon or carbon black. Further, these carbons may advantageously have deposited thereon catalytic materials. Usually, from about 0% to about 80%, and preferably from 55% to about 75% of the conductive filler, based on the weight of the electrode solids blend, can be employed.

As previously stated, it is desirable to employ initially a water-repellent compositon in admixture with the aforementioned catalytic metal and electrically conductive filler composition. Such combination reduces the possibility of flooding during cell operation. If a water-repellent composition is omitted, poor performance of the over-all fuel cell is noted in a comparatively short period of time. Illustrative water-repellent compositions contemplated are either polyethylene latex- or polytetrafluoroethylene latex-emulsions. In general, from about 1% to about 40% by weight of the water-proofing material, based on the weight of the overall electrode solids, may be added to the conductive filler prior to deposition of or admixture with catalyst.

The catalyst, in amounts equal to from about 1% to 98%, based on the weight of the electrode solids, is usually a metal, such as platinum, palladium, ruthenium, silver, nickel or a mixture thereof. The metal can be deposited on previously water-proofed carbon by reducing the metal in the form of its acid or salt such as, for instance, the sodium borohydride reduction of chloroplatinic acid to platinum. Further, the metallic catalyst can be added in a finely divided state to the water-proofing latex emulsion as hereinabove defined. If desired, colloidal silica or alumina may be added from 1% to 40% based on the total weight of electrode solids. However, prior to use, the inorganic filler is substantially removed by any convenient method, such as by extraction with strong alkali.

In general, either the polyethylene latex emulsion or the polytetrafluoroethylene latex emulsion, for instance, can be formed by dispersing discrete particles of polyethylene or polytetrafluoroethylene in distilled water containing either a non-ionic or anionic emulsifying agent, such as, for example, polyethoxylated octylphenol, polyethoxylated nonylphenol, or an alkali metal salt of an alkylaryl sulfonic acid. Advantageously, any commercially available non-ionic or anionic emulsifying agent of the class defined can be employed to stabilize the dispersion. The amount of emulsified particles usually ranges from about 40% to about 60% of the overall latex or emulsion composition. Resultant mixture is thoroughly blended or admixed and may be used as such or may be spread on a screen substrate. If used as such, the mixture is spread evenly on one surface of either a porous, fibrillated polytetrafluoroethylene or a porous, fibrillated polytrifluorochloroethylene sheet, usually from about 1 x 10⁻³ inch to 20 x 10⁻³ inch thick, and squeezed dry. Substantial amounts of water are removed and the composite is molded under heat and pressure. A temperature from about 100° C. to about 150° C. and a pressure of about 100 pounds per square inch are sufficient to prepare the contemplated electrode. If the catalyst mixture is spread on a screen, the latter may be laminated on the substrate under the heat and pressure aforementioned.

Resultant electrode is then washed with either aqueous mineral acids or bases, to remove soluble additives therefrom. Aliphatic alcohols, such as ethyl alcohol or isopropanol, or equivalents thereof, can also be employed to remove any occluded emulsifier or molding lubricant which normally would impair the catalytic action of the formed electrode.

Operativeness of the so-prepared electrode depends upon its positioning in a free electrolyte type fuel cell. Thus, the catalyst surface must face the electrolyte, whereas the substrate surface must face the incoming gases. On one side, oxygen gas or air is introduced on one of the electrodes. Hydrogen or a hydrocarbon gas, such as propane, is introduced on a second electrode positioned opposite the first electrode in which oxygen gas or air is introduced. The over-all reaction may be written as follows:

At the anode

$$C_3H_8 + 6H_2O \rightarrow 3CO_2 + 20H^+ + 20e^-$$

At the cathode

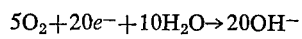
$$5O_2 + 20e^- + 10H_2O \rightarrow 20OH^-$$

Advantageously, the over-all cell can be operated over a wide range of temperatures, usually from 25° C. to about 225° C., or higher. The substrate which forms an integral unit comprising the electrode is thermally inert to such elevated temperatures.

In order to clarify the invention utilizing the above-formed electrode, the accompanying drawing defines one embodiment of such utilization.

In FIG. 1, there is shown a composite electrode 1, comprising a porous, unsintered, fibrillated gas permeable, but liquid impermeable, polytetrafluoroethylene substrate 2 having an average pore diameter equal to from 2 to about 10 microns and molded thereon a catalyst composition 3. Prior to or subsequent to the molding of the two surfaces, there is added a current collector 11.

In FIG. 2, there is shown in cross section a free electrolyte fuel cell 4 comprising in combination an electrolyte chamber 5, into which electrolyte is introduced through port, 5a, the electrode 6 of FIG. 1, wherein the catalytic surface 7 abuts the electrolyte and the hereinabove defined gas permeable, liquid impermeable polytetrafluoroethylene or polytrifluorochloroethylene substrate. Substrate surface 8 abuts or faces chamber 9, containing a fuel or oxidant enveloped by face plates 10 and 10a. The electrodes 6 and 6a contain current collectors or wire leads 11 and 12, respectively, which are embedded between the catalytic paste surface and the substrate surface. If desired, they may be embedded also in the molded catalytic paste layer 7. Inert gaskets, 13 and 14, such as polytrifluorochloroethylene or silicone rubber position the electrode 6 and face plate 10, respectively, thus preventing undue leakage of liquid electrolyte from chamber 5. Inlet ports 15 and 16 provide ready access to gas chamber 9 and outlet ports 17 and 18 provide for elimination of excess input gas. The fuel cell is secured by means of bolts 19 and 19a and nuts 20 and 20a, as shown. If desired, a surrounding heat jacket (not shown) about the fuel cell is advantageously provided.

The invention will be further illustrated in conjunction with the folowing examples which are to be taken as illustrative only and not by way of limitation. All parts are by weight unless otherwise noted.

EXAMPLE 1

A paste mixture of 8 parts of platinum black, 2 parts of colloidal alumina and 3 parts by volume of polytetrafluoroethylene emulsion (60% solids) is mixed with 6 parts by volume of water and 4 parts by volume of mineral oil (Fractol A) and rolled onto a 6″ x 10″ screen of expanded tantalum metal. The resulting structure contains 20 mg./cm.$^2$ of platinum. The rolling operation requires 10 to 15 passes at 300 pounds per linear inch until the paste becomes hard and then at 650 pounds per linear inch for the remaining passes until the hard paste is perfectly imbedded into the expanded metal screen. The structure is washed for 1.5 hours in heptane at 80° C., then for 0.5 hour in 2B alcohol at room temperature, rinsed with water to remove the alcohol, followed by soaking in $6NH_2SO_4$ for 1.5 hours at 80° C. to remove colloidal alumina and, finally, rinsed with distilled water and dried on filter paper.

The catalyzed screen so-prepared is laminated with a sheet of 0.010 inch thick porous, unsintered, fibrillated polytetrafluoroethylene as hereinabove prepared by pressing between caul plates at 500 p.s.i. for ten minutes at 150° C. To the electrode structure is spot welded a platinum current collector onto the edge of the expanded tantalum screen.

The laminated electrode structure is then incorporated into a free electrolyte cell described in FIG. 2 of the drawing. The electrodes have an exposed area of five square centimeters and the interelectrode spacing is ⅛ inch as defined by the thickness of the electrolyte block. The latter is filled with 85% phosphoric acid, and the cell assembly is heated to 150° C. At this temperature, the cell resistance is 0.16 ohm. Over a prolonged time period, no leakage of electrolyte occurs, although the porous, unsintered fibrillated polytetrafluoroethylene (TFE) backing is 0.010 inch thin.

Electrodes prepared having the porous, fibrillated polytetrafluoroethylene backing are tested as hydrogen and propane anodes in hydrogen-oxygen and propane-oxygen fuel cells, respectively. The oxygen electrode in these tests contained the same catalyst paste composition, but commercially available porous "Teflon" sheets (0.04 inch thick) prepared by sintering are substituted for the porous, unsintered, fibrillated polytetrafluoroethylene. Overall operating results for hydrogen-oxygen and propane-oxygen fuel cells with 85% phosphoric acid are recorded in Table III below.

TABLE III

| Current density, ma.$^1$/cm.$^2$ | Operating voltage (150° C.) | |
|---|---|---|
| | Hydrogen/O$_2$ | Propane/O$_2$ |
| 0 | 1.00 | 0.90 |
| 10 | 0.95 | 0.62 |
| 20 | 0.92 | 0.55 |
| 40 | 0.88 | 0.47 |
| 100 | 0.78 | 0.31 |
| 200 | 0.62 | 0.13 |

$^1$ Ma.=milliamperes.

In comparing the foregoing hydrogen and propane electrodes with electrodes prepared with the same catalyst paste composition of Example 1, but substituting a commercially-available sintered, porous "Teflon" sheet of 0.04 inch thickness, the following fuel cell results are reported in Table IV below:

TABLE IV

| Current density, ma.$^1$/cm.$^2$ | Operating voltage (150° C.) propane/O$_2$ |
|---|---|
| 0 | 0.91 |
| 10 | 0.61 |
| 20 | 0.53 |
| 40 | 0.44 |
| 100 | 0.27 |
| 200 | 0 |

$^1$ Ma.=milliamperes.

EXAMPLE 2

The procedure of Example 1 is repeated in every respect except that an electrode is prepared by laminating a 0.015 inch thick sheet of sintered, porous "Teflon," as hereinabove described in Table II, with the platinum catalyst layer having a loading of 20 mgs./cm.$^2$ platinum. Under the cell conditions described in Example 1, the electrode is inoperative because severe leakage of hot phosphoric acid electrolyte occurs quickly.

EXAMPLE 3

Repeating the procedure of Example 1 for utilizing the electrode prepared in Example 2 except that it is used as the oxygen electrode and the sintered-backed "Teflon" electrode is used as the fuel electrode. The electrodes are employed in a hydrogen-oxygen fuel cell of the type shown in FIG. 2 employing 85% phosphoric acid at 150° C. as the electrolyte. The results are recorded in Table V below:

TABLE V

| Current density (in milliamperes square centimeters) | Operating voltage hydrogen-oxygen |
|---|---|
| 0 | 1.07 |
| 10 | 0.95 |
| 20 | 0.92 |
| 40 | 0.88 |
| 100 | 0.76 |
| 200 | 0.62 |

Advantageously, the electrodes of the present invention may be employed either as fuel or oxygen electrodes. They may, if desired, be employed simultaneously as fuel and oxygen electrodes exhibiting good performance at ordinary and elevated temperatures.

I claim:

1. In an electric current producing cell having a free electrolyte and at least one electrode comprising, (a) a gas permeable, liquid impermeable, porous, fibrillated, unsintered polytetrafluoroethylene substrate having an average pore diameter between 2 and 10 microns and (b) a composition molded thereon comprising (1) an electrically conductive filler being present in an amount equal to between about 0% and 80%, (2) a catalyst equal to from about 1% to about 98%, and (3) a water-repellent composition equal to from about 1% to 40%, said percentages totalling 100% and being based upon the weight of the electrode solids mixture, said free electrolyte is in contact with said composition.

2. The electrode according to claim 1, wherein the conductive filler is a graphitic carbon.

3. The electrode according to claim 1, wherein the catalyst is platinum.

4. The electrode according to claim 1, wherein the water-repellent composition is a dispersion of polyethylene.

5. The electrode according to claim 1, wherein the water-repellent composition is a dispersion of polytetrafluoroethylene.

6. In an electric current producing cell having a free electrolyte and at least one electrode comprising, (a) a gas permeable, liquid impermeable polytetrafluoroethylene substrate having an average pore diameter between 2 and 10 microns, and (b) an inert screen molded to the latter substrate, said screen containing a composition comprising (1) an electrically conductive filler being present in an amount equal to between about 0% and 80%, (2) a catalyst equal to from about 1% to about 98%, and (3) a water-repellent composition equal to from about 1% to 40%, said percentages totalling 100% and being based upon the weight of the electrode solids mixture, said free electrolyte is in contact with said composition.

7. The electrode according to claim 6, wherein the inert screen is tantalum.

8. The electrode according to claim 6, wherein the inert screen is nickel.

9. A free electrolyte fuel cell comprising in combination: a chamber for receiving electrolyte, two opposite walls of said chamber composed of two electrode structures, each of which being defined in claim 1, the catalytic surface of said electrode structure being positioned adjacent to and facing directly said electrolyte chamber and the said porous, unsintered, fibrillated polytetrafluoroethylene substrate surface being positioned to face a zone adapted to receive a gas reactant, current collector embedded in said electrode structure, conductive layer, inlet ports to receive separately oxidant gas and hydrogen, and outlet ports whereby excessive amounts of incoming gases can be withdrawn.

References Cited

UNITED STATES PATENTS

| | | |
|---|---|---|
| 3,348,975 | 10/1967 | Ziering |
| 3,276,909 | 10/1966 | Moos. |
| 3,297,484 | 1/1967 | Niedrach. |

WINSTON A. DOUGLAS, Primary Examiner

H. A. FEELEY, Assistant Examiner

U.S. Cl. X.R.

136—120

UNITED STATES PATENT OFFICE
CERTIFICATE OF CORRECTION

Patent No. 3,527,616                    Dated September 8, 1970

Inventor(s) HENRY PATRICK LANDI

It is certified that error appears in the above-identified patent and that said Letters Patent are hereby corrected as shown below:

Column 3, line 1 of Table II should be corrected to read:

-- Thickness (inches)         0.010-0.015        0.04-0.05 --

SIGNED AND SEALED
NOV 17 1970

(SEAL)
Attest:

Edward M. Fletcher, Jr.
Attesting Officer

WILLIAM E. SCHUYLER, JR.
Commissioner of Patents